United States Patent
Lee et al.

(10) Patent No.: US 11,172,519 B2
(45) Date of Patent: Nov. 9, 2021

(54) METHOD FOR TRANSMITTING RRC CONNECTION REQUEST, AND TERMINAL THEREFOR

(71) Applicant: LG ELECTRONICS INC., Seoul (KR)

(72) Inventors: Kilbom Lee, Seoul (KR); Ilmu Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 16/345,689

(22) PCT Filed: Nov. 2, 2016

(86) PCT No.: PCT/KR2016/012521
§ 371 (c)(1),
(2) Date: Apr. 26, 2019

(87) PCT Pub. No.: WO2018/084331
PCT Pub. Date: May 11, 2018

(65) Prior Publication Data
US 2019/0357274 A1 Nov. 21, 2019

(51) Int. Cl.
*H04W 76/10* (2018.01)
*H04W 16/28* (2009.01)
*H04W 74/08* (2009.01)

(52) U.S. Cl.
CPC ........... *H04W 76/10* (2018.02); *H04W 16/28* (2013.01); *H04W 74/0833* (2013.01)

(58) Field of Classification Search
None
See application file for complete search history.

(56) References Cited

U.S. PATENT DOCUMENTS

2013/0040684 A1* 2/2013 Yu .................. H04L 5/0048 455/517
2015/0215910 A1* 7/2015 Han .................. H04W 56/0045 370/329

(Continued)

FOREIGN PATENT DOCUMENTS

| KR | 1020160081755 | 7/2016 |
| WO | 2015088191 | 6/2015 |
| WO | 2016086144 | 6/2016 |

OTHER PUBLICATIONS

PCT International Application No. PCT/KR2016/012521, Written Opinion of the International Searching Authority dated Jul. 25, 2017, 15 pages.

*Primary Examiner* — Peter Chen
*Assistant Examiner* — Jeff Banthrongsack
(74) *Attorney, Agent, or Firm* — Lee, Hong, Degerman, Kang & Waimey (57) ABSTRACT

A method by which a terminal transmits an RRC connection request in a wireless communication system can comprise the steps of: receiving, from a base station, information of the base station beam index; receiving information on a mapping relationship between the base station beam index and an uplink reference signal port; selecting a preferred base station beam index on the basis of the information of the base station beam index; and transmitting an RRC connection request message on the basis of the information on a mapping relationship by using the uplink reference signal port corresponding to the selected base station beam index.

6 Claims, 7 Drawing Sheets

(56) References Cited

U.S. PATENT DOCUMENTS

2016/0134352 A1* 5/2016 Stirling-Gallacher ........................ H04B 7/0456
370/329
2017/0325260 A1* 11/2017 Guo ...................... H04L 5/0023

\* cited by examiner

Case I  Case II

METHOD FOR TRANSMITTING RRC CONNECTION REQUEST, AND TERMINAL THEREFOR

CROSS-REFERENCE TO RELATED APPLICATIONS

This application is the National Stage filing under 35 U.S.C. 371 of International Application No. PCT/KR2016/012521, filed on Nov. 2, 2016, the contents of which are hereby incorporated by reference herein in its entirety.

TECHNICAL FIELD

The present disclosure relates to a wireless communication system, and more particularly, to a method of transmitting a Radio Resource Control (RRC) connection request and terminal therefor.

BACKGROUND

Before describing the present disclosure, the random access procedure of the LTE system will be described in brief. In the LTE system, random access is used for the following several purposes:

1) To establish a radio link during initial access (switching from RRC_IDLE to RRC_CONNECTED);
2) To re-establish a radio link after radio link failure;
3) To establish uplink synchronization with a new cell through handover;
4) To establish uplink synchronization if uplink or downlink data arrives when a terminal is in the RRC_CONNECTED state but is not uplink-synchronized;
5) To perform positioning when a positioning method is used based on uplink measurements; and
6) To request scheduling when there is no dedicated scheduling request resource on a Physical Uplink control Channel (PUCCH)

Among these purposes, acquisition of uplink synchronization is one of the main objectives. When an initial radio link is established, the random access procedure serves the purpose of allocating a unique identifier, a C-RNTI to a terminal. For the random access, a contention-based scheme or a contention-free scheme can be used.

DISCLOSURE OF THE INVENTION

Technical Task

The first object of the present disclosure is to provide a method performed by a terminal for transmitting an RRC connection request in a wireless communication system.

The second object of the present disclosure is to provide a terminal for transmitting an RRC connection request in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve the first object, provided is a method of transmitting a Radio Resource Control (RRC) connection request by a terminal in a wireless communication system. The method may include: receiving information about base station beam indices from a base station; receiving, from the base station, information on a mapping relationship between the base station beam indices and uplink reference signal ports; selecting a preferred base station beam index based on the information about the base station beam indices; and transmitting an RRC connection request message indicating the selected base station beam index. In this case, the selected base station beam index may correspond to a first preferred base station beam index of the terminal or a second preferred based station beam index thereof.

The information about the base station beam indices and the information on the mapping relationship between the base station beam indices and the uplink reference signal ports may be received in a Random Access Channel (RACH) response message, Downlink Control Information (DCI), or an RRC message. The RRC message may include a System Information Block (SIB) type message. The method may further include transmitting an RACH preamble to the base station, and in this case, the RACH response message may be received in response to the RACH preamble.

The selected base station beam index may include a base station beam index with highest Reference Signal Received Power (RSRP) or highest Reference Signal Received Quality (RSRQ). The uplink reference signal port may include an uplink Demodulation Reference Signal (DMRS) port.

In the method, the RRC connection request message may be transmitted through an uplink reference signal port corresponding to the selected base station beam index and include information on the selected base station beam index.

In the method, the base station may send beam indication to the terminal based on a beam fed back from the terminal, and the terminal may interpret the base station's beam indication based on the preferred base station transmission beam (preferred gNB Tx beam), which is fed back by the corresponding terminal.

To achieve the second object, provided is a terminal for transmitting a Radio Resource Control (RRC) connection request in a wireless communication system. The terminal may include: a receiver configured to receive, from a base station, information about base station beam indices and information on a mapping relationship between the base station beam indices and uplink reference signal ports; a processor configured to select a preferred base station beam index based on the information about the base station beam indices; and a transmitter configured to transmit an RRC connection request message indicating the selected base station beam index. In this case, the selected base station beam index may correspond to a first preferred base station beam index of the terminal or a second preferred based station beam index thereof.

The receiver may be configured to receive the information on the mapping relationship between the base station beam indices and the uplink reference signal ports in a Random Access Channel (RACH) response message or an RRC message. The RRC message may correspond to a System Information Block (SIB) type message.

The transmitter may be configured to transmit an RACH preamble to the base station, and the receiver may be configured to receive the RACH response message in response to the RACH preamble.

The selected base station beam index may include a base station beam index with highest Reference Signal Received Power (RSRP) or highest Reference Signal Received Quality (RSRQ).

The RRC connection request message may be transmitted through an uplink reference signal port corresponding to the selected base station beam index and include information on the selected base station beam index.

The uplink reference signal port may include an uplink Demodulation Reference Signal (DMRS) port.

Advantageous Effects

According to the RRC connection request method of the present disclosure, contention between terminals can be resolved, thereby improving decoding performance of a base station.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention and are incorporated in and constitute a part of this specification, illustrate embodiments of the invention.

MODE FOR INVENTION

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

Figure 1:
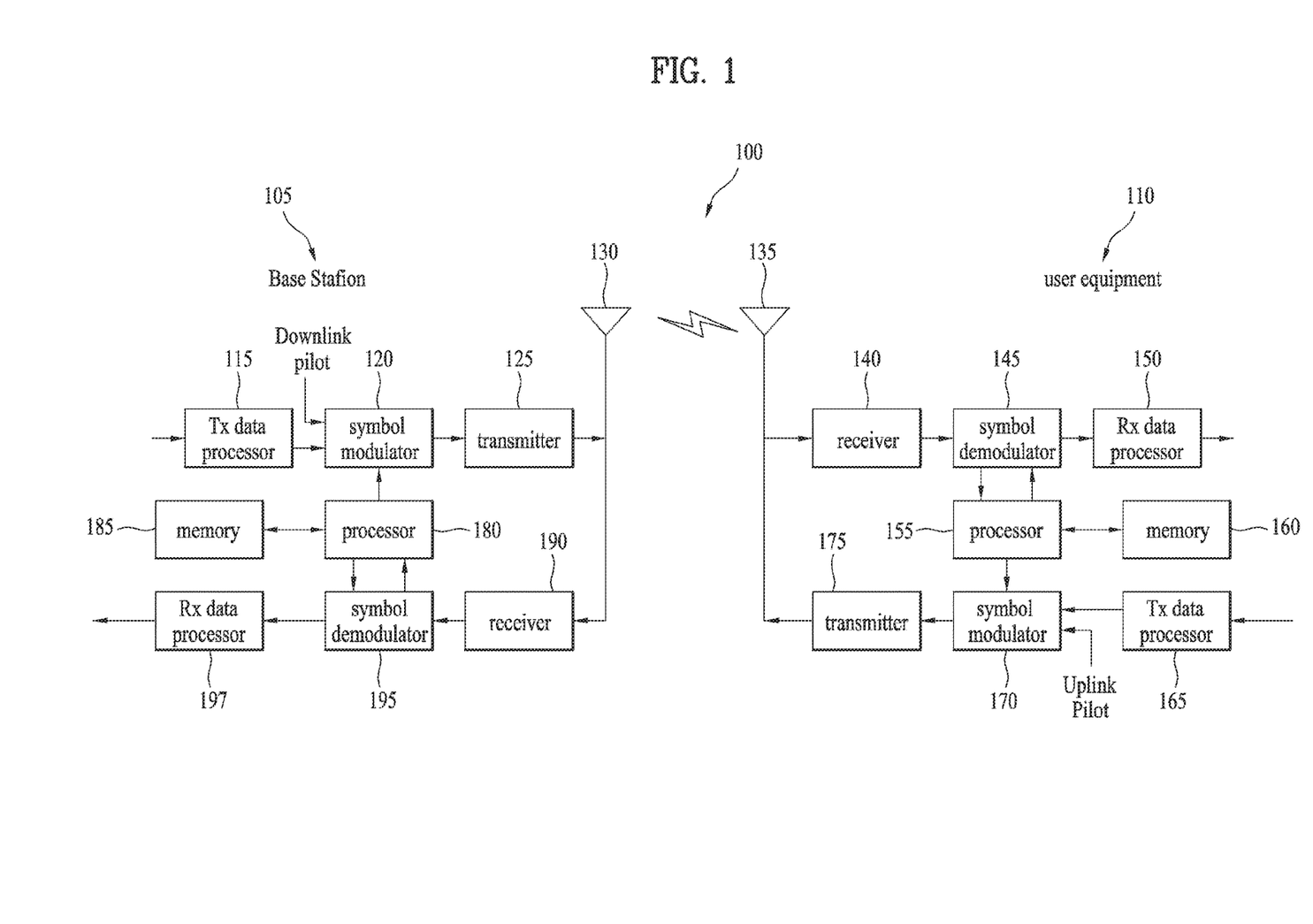
FIG. 1 is a block diagram for configurations of a base station 105 and a user equipment 110 in a wireless communication system 100.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Figure 2:
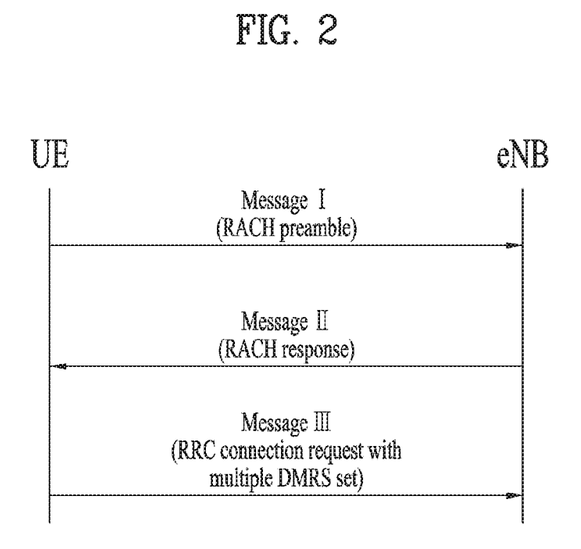
FIG. 2 is a diagram illustrating an RACH procedure based on two-step contention resolution.

Referring to FIG. 2, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

FIG. 2 is a diagram illustrating an RACH procedure based on two-step contention resolution.

Referring to FIG. 2, after a UE transmits a message (message 1) containing an RACH preamble to a BS (eNB), the BS can transmit a message (message 2) containing an RACH response to the UE. Thereafter, the UE can transmit a message (message 3) for an RRC connection request to the BS. In this case, message 3 may carry information on available multiple Demodulation Reference Signal (DMRS) candidates together with the RRC connection request. After randomly selecting one of the multiple DMRS candidates, the UE may transmit an uplink DMRS. In this case, although two UEs perform the RRC connection request using the same resource, the BS can successfully decode the RRC connection request from the two UEs if the two UEs select different DMRSs.

Figure 3:
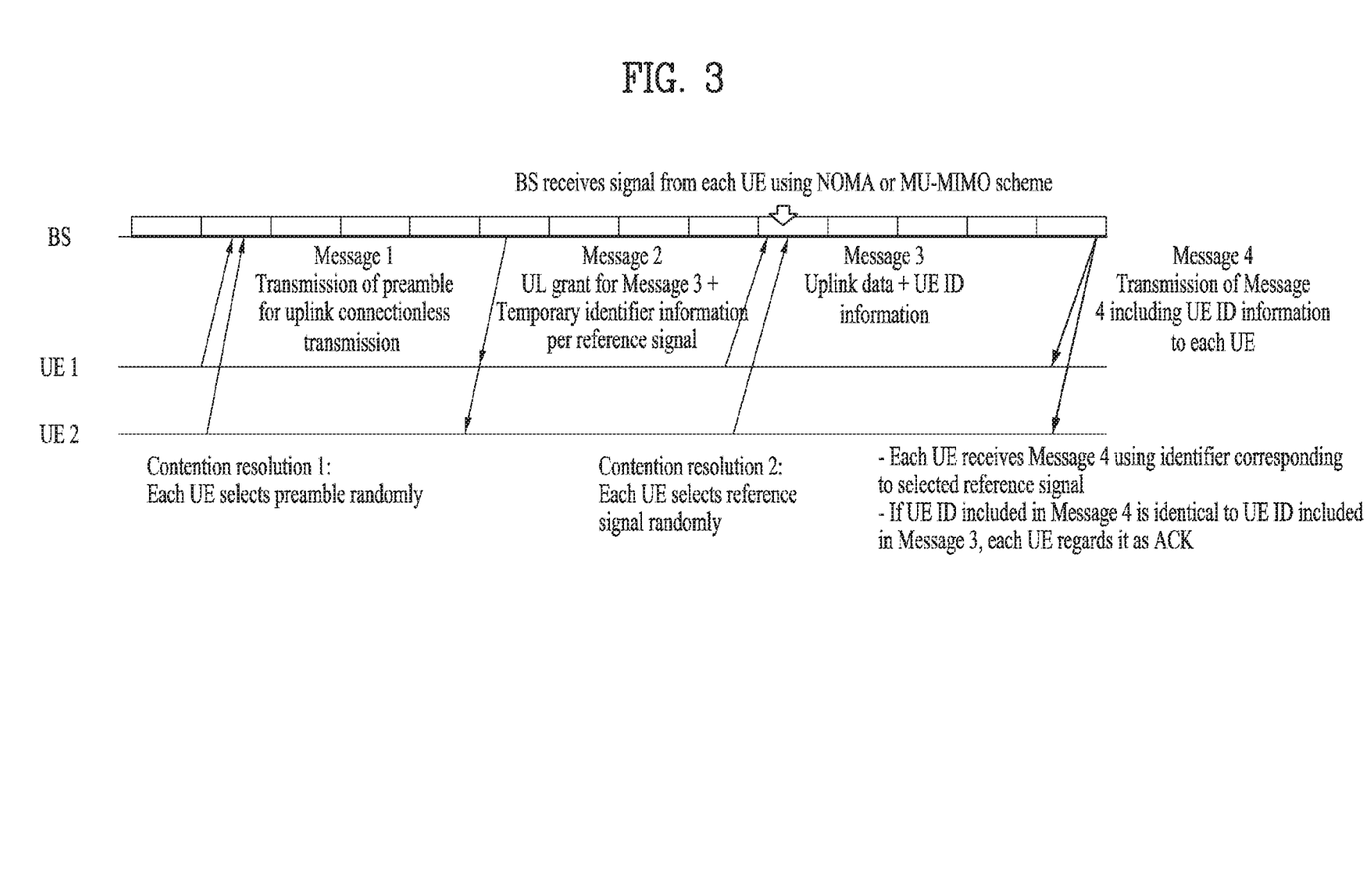
FIG. 3 is a diagram illustrating in more detail the RACH procedure proposed in FIG. 2.

FIG. 3 is a diagram illustrating in more detail the RACH procedure proposed in FIG. 2.

Specifically, FIG. 3 illustrates the RACH procedure based on the two-step contention resolution. Referring to FIG. 3, in contention resolution 1, each UE can avoid a primary collision by selecting a random RACH preamble, and in contention resolution 2, each UE can avoid a secondary collision by selecting a random DMRS. Consequently, RACH collision probability between UEs can be significantly reduced by further using contention resolution 2.

Figure 4:
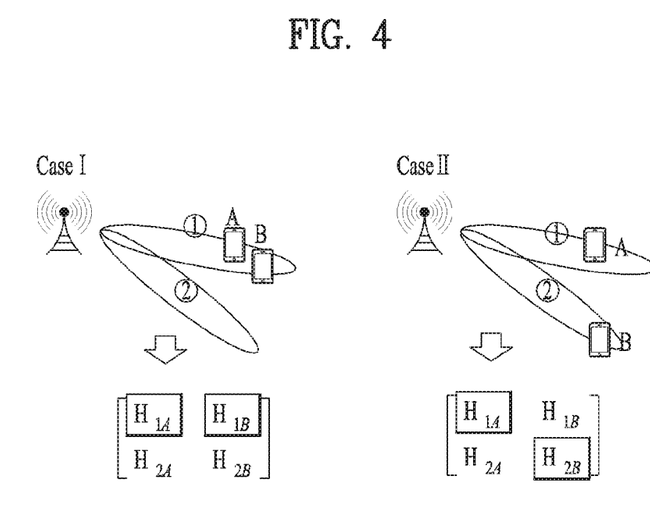
FIG. 4 is a schematic diagram for explaining effective channels for UEs when the UEs have the same beam or different beams.

FIG. 4 is a schematic diagram for explaining effective channels for UEs when the UEs have the same beam or different beams.

In FIG. 4, Case I shows that two UEs exist on beam 1 at the same time, and Case II shows that two UEs exist on beams #1 and #2, respectively. If two UEs simultaneously transmit data to a BS using the same time/frequency resource, signals received by the BS from the two UEs can be expressed as shown in Equation 1.

$$\begin{bmatrix} r_1 \\ r_2 \end{bmatrix} = \begin{bmatrix} H_{1A} & H_{1B} \\ H_{2A} & H_{2B} \end{bmatrix} \begin{bmatrix} s_A \\ s_B \end{bmatrix} + \begin{bmatrix} n_1 \\ n_2 \end{bmatrix}$$ [Equation 1]

First, beams of the BS correspond to reception antennas thereof one-by-one. In Equation 1, r1 and r2 indicate signals received at reception antennas #1 and #2, respectively, and $S_A$ and $S_B$ indicate data of UE A and data of UE B, respectively. In addition, $H_{aB}$ indicates a channel between antenna #a and UE B.

In Case I, the first row of the channel matrix has high power, whereas the second row thereof has relatively low power. If the power of the second row is extremely low, the BS should decode the data transmitted from the two UEs using a Non-Orthogonal Multiple Access (NOMA) scheme. In this case, it is expected that the NOMA scheme has proper performance only when there is a significant difference between received power from the two UEs. However, if the two UEs control their power, the power difference between the two signals decreases so that the performance is significantly degraded. Meanwhile, in Case II, the diagonal terms of the channel matrix have high power, whereas off-diagonal terms thereof have relatively low power. In this case, the BS can easily decode the data transmitted from the two UEs using a linear filter (e.g., MMSE).

Defining two UEs, which use the same time/frequency resource, on different beams can guarantee high performance in terms of decoding compared to defining the two UEs on the same beam. Accordingly, the present disclosure proposes a method of resolving contention by associating a DMRS port index with a UE's preferred beam index in an RRC connection request (message 3) and further reporting the preferred beam index.

Figure 5:
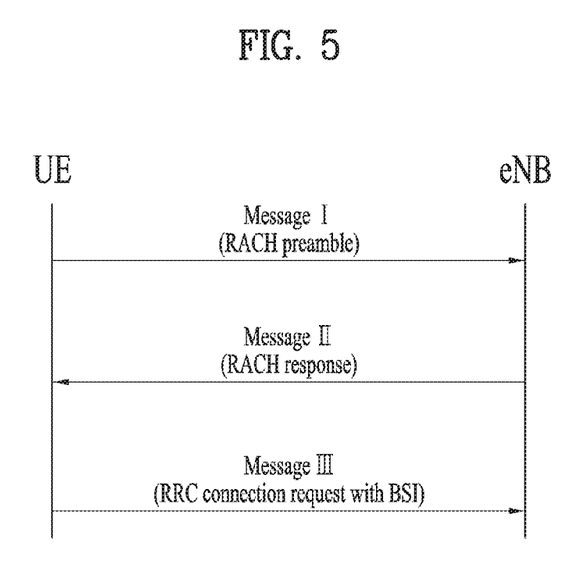
FIG. 5 is a diagram illustrating an RACH procedure according to the present disclosure.

FIG. 5 is a diagram illustrating an RACH procedure according to the present disclosure.

UE's RACH-based initial access is defined as follows. A UE can transmit an RACH preamble to a BS (eNB). The BS can receive the RACH preamble from the UE in Message I using multiple beams. Thereafter, the BS can transmit, to the UE, an RACH Response (RAR) in Message II. The RAR may include information on uplink resources allocated for the UE.

In this case, at least one of the multiple beams corresponds to a UE's preferred beam, that is, a beam that is superior in terms of UE's received power. Here, the beam superior in terms of the received power means, for example, a beam with high Reference Signal Received Power (RSRP) or high Reference Signal Received Quality (RSRQ) with respect to a signal received from the BS. The UE can transmit an RRC connection request to the BS using the allocated uplink resources. In this case, the UE may transmit Beam State Information (BSI) to the BS through the RRC connection request.

Figure 6:
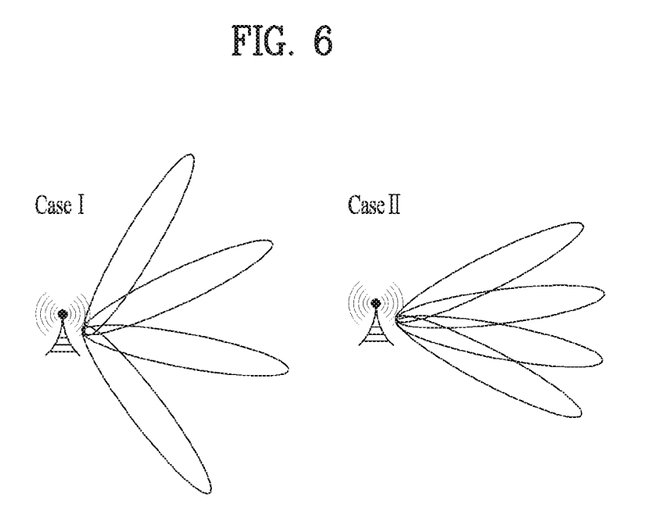
FIG. 6 is a diagram illustrating exemplary BS beam patterns.

FIG. 6 is a diagram illustrating exemplary BS beam patterns.

If two UEs perform transmission at the same time using the same RACH preamble, there occurs a collision. When full beam-level channel reciprocity is not established or when BS reception beams are defined as shown in Case II of FIG. 6, the BS may be unable to accurately recognize which beam a UE prefers. In this case, the BS can know the best beam of the UE only when the BS explicitly receives BSI from the UE in the message III step. In the following, the best beam means a BS's beam with the highest quality from the perspective of a specific UE, for example, a beam with the highest RSRP or a beam with the best RSRQ.

Embodiment 1

A BS may transmit, to a UE, information on mapping rules between beam indices and uplink DMRS ports by including the information in an RACH response. When transmitting message 3 (or an RRC connection request), the UE uses a DMRS port corresponding to the index of its preferred beam based on the mapping rules. After decoding message 3 (msg 3), the BS may interpret the beam corresponding to the DMRS selected by the UE as the BS transmission beam preferred by the corresponding UE.

Figure 7:
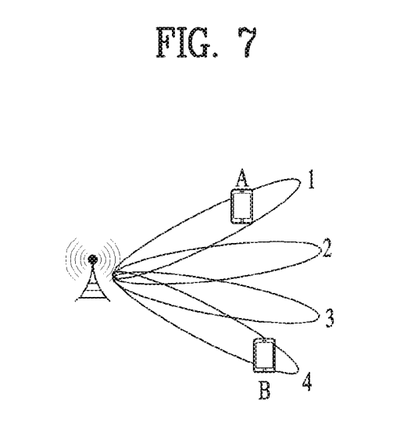
FIG. 7 is a diagram for explaining an operation of receiving RACH preambles using four reception beams relating to Embodiment 1.

FIG. 7 is a diagram for explaining an operation of receiving RACH preambles using four reception beams relating to Embodiment 1.

Specifically, FIG. 7 shows that a BS receives RACH preambles from two UEs (UEs A and B) through four reception beams. In this case, each of UEs A and B can know which beam is the most suitable beam for itself using beam reference signals (BRSs). That is, UE A can know that beam #1 is the best beam, and UE B can know that beam #4 is the best beam.

Meanwhile, it is assumed that UEs A and B transmit the same RACH preamble on the same time-frequency resources. In this case, the BS may define one RACH Response (RAR) for UE A and transmit the RACH response to UE A using beam #1 as the transmission beam. In addition, the BS may define one RACH response for UE B and transmit the RACH response to UE B using beam #4 as the transmission beam.

Figure 8:
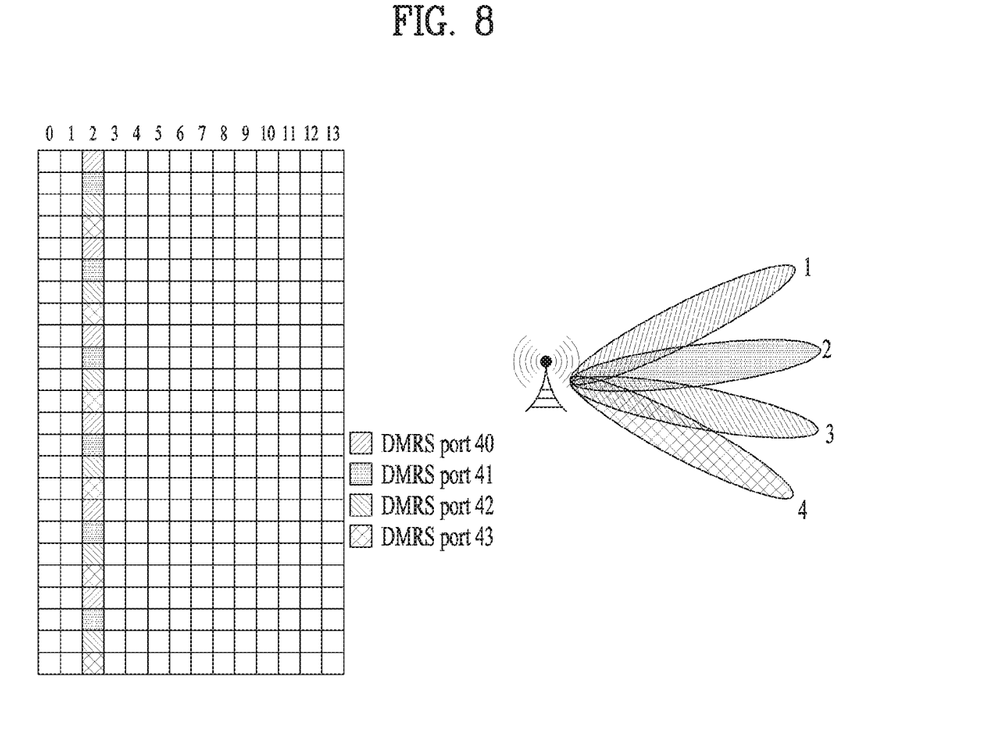
FIG. 8 is a diagram for explaining an exemplary mapping relationship between DMRS port indices and beam indices.
Figure 9:
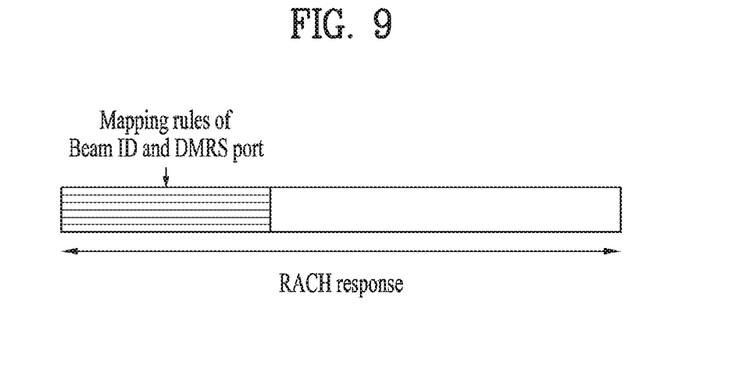
FIG. 9 is a diagram for explain an exemplary RACH response based on mapping rules.

FIG. 8 is a diagram for explaining an exemplary mapping relationship between DMRS port indices and beam indices, and FIG. 9 is a diagram for explain an exemplary RACH response based on mapping rules.

Referring to FIG. 8, four DMRS ports, i.e., DMRS ports 40 to 43 can be defined. For example, DMRS ports 40 to 43 may be mapped to beams #1 to #4, respectively. As shown in FIG. 9, a BS can transmit information on mapping rules between DMRS port indices and beam indices to UEs by including the information in RACH responses (RARs) as described above with reference to FIG. 7.

To transmit a message for an RRC connection request (message 3) to the BS, UE A and UE B use DMRS port 40 and DMRS port 43, respectively. That is, each UE uses a DMRS port as a signature for transmission of a preferred beam index. Even when UEs A and B transmit the same RACH preamble at the same time, if UEs A and B select different beams (that is, if UEs A and B select different DMRSs), the BS may decode message 3 transmitted from UEs A and B. Consequently, RACH collision probability can be reduced. In addition, the decrease in the RACH collision probability can guarantee the BS to have high decoding performance If UEs A and B select different DMRSs even though they are located on the same beam, it is possible to avoid an RACH collision. However, when a power difference between signals received from the two UEs is low, the BS cannot obtain high NOMA decoding performance for the two UEs (UEs A and B) belonging to the same beam. In other words, if the power difference between the signals received from the two UEs is low, the decoding performance of the BS may decrease even though the two UEs transmit the different DMRSs through the same beam.

For these reasons, the BS can obtain high decoding performance when UEs A and B transmit message 3 using different beams, that is, by selecting different DMRS ports as in the proposed method, compared to when UEs A and B use the same beam for the transmission. In addition, when the proposed method is used, it is not necessary to separately define a resource (e.g., PUSCH resource) for each UE to report its preferred beam.

Figure 10:
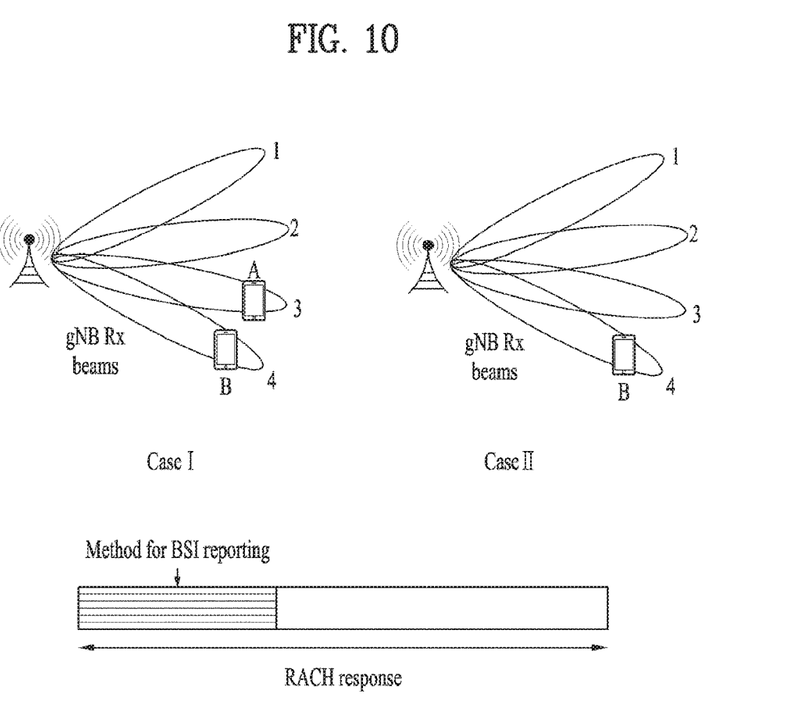
FIG. 10 is a diagram for explaining the effect of Embodiment 1.

FIG. 10 is a diagram for explaining the effect of Embodiment 1.

Although UE B (denoted as B in FIG. 9) transmits an RACH preamble (Msg 1) using BS (gNB) Reception (Rx) beam #4, the RACH preamble signal may be transmitted through gNB Rx beam #3 due to a certain reflector (in particular, when beam #3 is close to beam #4). In this case, since the received signal power levels of gNB Rx beams #3 and #4 increase, a BS cannot identify whether the current situation corresponds to Case I or Case II in FIG. 9.

If the BS assumes Case I, the BS should allocate a PUSCH resource for Msg III to each of UE A and UE B. That is, only one PUSCH resource is required since only UE B performs transmission. However, since two resources are allocated, resource waste occurs. In this case, if the proposed method related to Embodiment 1 is used, the BS can allocate one PUSCH resource, and UE B can select a DMRS corresponding to beam #4 and transmit the DMRS to the BS.

In addition, even when both UEs A and B are present, there occurs no collision since UEs A and B can select DMRSs corresponding to beams #3 and #4, respectively. Consequently, the proposed method is advantageous in that it is not necessary to allocate excessive resources for transmission of Msg III even if there is ambiguity from the perspective of a BS as shown in FIG. 9.

Meanwhile, a BS can inform each UE of mapping rules between DMRS port indices and beam indices through RRC signaling (e.g., System Information Block (SIB)). That is, the BS may inform each UE of the mapping rules shown in FIG. 9 through RRC signaling other than an RACH response.

Embodiment 2

A BS can inform a UE whether the UE should transmit the index of its preferred beam using a DMRS port or by multiplexing Uplink Control Information (UCI) with a PUSCH through an RACH response or RRC signaling.

Figure 11:
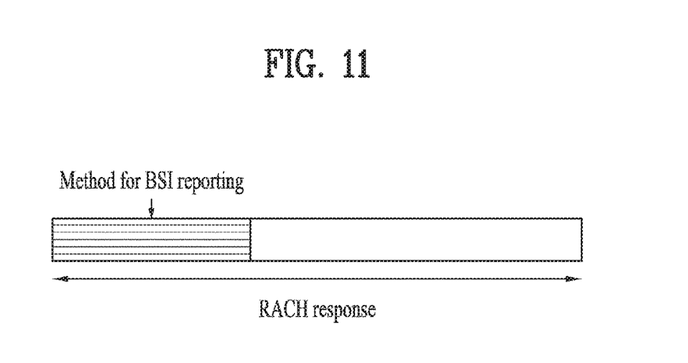
FIG. 11 is a diagram illustrating an RACH response for informing a BSI reporting method.

FIG. 11 is a diagram illustrating an RACH response for informing a BSI reporting method.

In terms of beam management, a BS can ret at least one UE's preferred beam. In this case, the BS can transmit, to a UE, information on PUSCH resources allocated for UE's BSI reporting by including the information in the RACH response. In addition, using a field of the RACH response, the BS can inform the UE whether the UE should inform the index of its preferred beam using a DMRS port or by transmitting UCI on a PUSCH in a multiplexing manner For example, by setting the field to '0', the BS may instruct the UE to report the index of the preferred beam using the DMRS port. On the contrary, by setting the field to '1', the BS may instruct the UE to multiplex the index of the preferred index (UCI) with the PUSCH and transmit the index on the PUSCH. In this case, the field may be located at the middle or end of the RACH response rather than the start thereof.

Embodiment 3

In Embodiment 1, a UE can inform its preferred beam using a DMRS port index. In this case, the preferred beam can be defined as one of the following two types. For example, a DMRS port index may indicate the first preferred (best) beam or the second preferred beam.

UE/BS Operations when a DMRS Port Index Indicates the First Preferred (Best) Beam When full beam-level channel reciprocity is not established or when BS reception beams are defined as shown in Case II of FIG. 6, a BS may require explicit signaling on the UE's best beam. To this end, a DMRS port index indicates the first preferred (best) beam.

Specifically, a UE may select a DMRS port index mapped to the best beam and then transmit a signal through a DMRS port corresponding to the selected DMRS port index. The BS may receive the signal from the corresponding UE through the DMRS port corresponding to the selected DMRS port index and then recognize what is the best beam of the corresponding UE based on information on mapping rules between beam indices and DMRS port indices.

UE/BS Operations when a DMRS Port Index Indicates the Second Preferred Beam

When full beam-level channel reciprocity is established or when BS reception beams are defined as shown in Case I of FIG. 6, a BS can implicitly know the UE's best beam. Thus, a DMRS port index may be used to indicate the second preferred beam. Specifically, a UE may select a DMRS port index mapped to the second preferred beam and then transmit a signal through a DMRS port corresponding to the selected DMRS port index. The BS may receive the signal from the corresponding UE through the DMRS port corresponding to the selected DMRS port index and then recognize what is the second preferred beam of the corresponding UE based on information on mapping rules between beam indices and DMRS port indices.

In other words, a BS may inform a UE whether a DMRS port index is to be mapped to the first preferred beam or the second preferred beam through RRC signaling or an RACH response.

Figure 12:
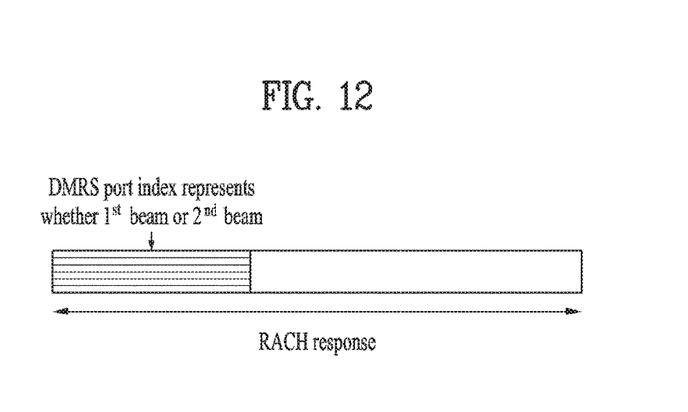
FIG. 12 is a diagram for explaining information included in an RACH response according to the present disclosure.

FIG. 12 is a diagram for explaining information included in an RACH response according to the present disclosure.

A BS can transmit, to each UE, a field for informing whether a DMRS port index indicates the UE's first preferred beam or the UE's second preferred beam by including the field in an RACH response. For example, by setting the field to '0', the BS may configure that the DMRS port index indicates the UE's first preferred beam. On the contrary, by setting the field to '1', the BS may configure that the DMRS port index indicates the UE's second preferred beam. In this case, the field may be located at the middle or end of the RACH response rather than the start thereof.

As described above, the present disclosure proposes a method of resolving contention by associating a DMRS port index with a UE's preferred beam index in an RRC connection request (message 3) and further reporting the preferred beam index.

In the present disclosure, a BS may send beam indication to a UE based on a beam fed back from the UE, and the UE may interpret the BS's beam indication based on the preferred BS transmission beam (preferred gNB Tx beam) which is fed back by the corresponding UE. For example, when a UE transmits msg 3 to a BS after selecting DMRS #4, the BS interprets that the corresponding UE prefers BS transmission beam #4. Thereafter, if the BS sends, for example, 1-bit beam indication, the UE may interpret the beam indication as follows. When the bit is '0', the UE may interpret the beam indication as BS transmission beam #3. On the contrary, when the bit is '1', the UE may interpret the beam indication as BS transmission beam #4.

Consequently, the UE can interpret the beam indication sent from the BS based on beam information that the UE feeds back.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

A method for transmitting a RRC connection request in a wireless communication system is available industrially in various wireless communication systems such as 3GPP LTE/LTE-A, 5G systems and etc.

What is claimed is:

1. A method of transmitting a Radio Resource Control (RRC) connection request by a user equipment (UE) in a wireless communication system, the method comprising:
   receiving a downlink reference signal from a base station;
   transmitting a random access preamble to the base station;
   receiving, from the base station, a random access response message including first information on a mapping relationship between downlink beam indices and uplink reference signal ports and second information informing whether the base station requests the UE to report the UE's first preferred downlink beam index or the UE's second preferred downlink beam index using an uplink reference signal port for a RRC connection request message,
   wherein the random access response message is received in response to the random access preamble to the base station;
   selecting one of the first preferred downlink beam index or the second preferred downlink beam index among the downlink beam indices based on the downlink reference signal and the second information; and
   transmitting the RRC connection request message using the uplink reference signal port related to the selected downlink beam index based on the first information.

2. The method of claim 1, wherein the selected downlink beam index comprises a downlink beam index with highest Reference Signal Received Power (RSRP) or highest Reference Signal Received Quality (RSRQ).

3. The method of claim 1, wherein the uplink reference signal port comprises an uplink Demodulation Reference Signal (DMRS) port.

4. A user equipment (UE) for transmitting a Radio Resource Control (RRC) connection request in a wireless communication system, the (UE) comprising:
   a transceiver for transmitting or receiving a radio signal; and
   a processor controlling the transceiver,
   wherein the processor is configured to:
      receive a downlink reference signal from a base station;
      transmit a random access preamble to the base station;
      receive, from the base station, a random access response message including first information on a mapping relationship between downlink beam indices and uplink reference signal ports and second information informing whether the base station requests the UE to report the UE's first preferred downlink beam index or the UE's second preferred downlink beam index using an uplink reference signal port for an RRC connection request message,
      wherein the random access response message is received in response to the random access preamble to the base station;
      select one of the first preferred downlink beam index or the second preferred downlink beam index among the downlink beam indices based on the downlink reference signal and the second information; and
      transmit the RRC connection request message using an uplink reference signal port related to the selected downlink beam index based on the first information.

5. The user equipment of claim 4, wherein the selected downlink beam index comprises a downlink beam index with highest Reference Signal Received Power (RSRP) or highest Reference Signal Received Quality (RSRQ).

6. The user equipment of claim 4, wherein the uplink reference signal port comprises an uplink Demodulation Reference Signal (DMRS) port.

* * * * *